United States Patent
Iyengar et al.

(10) Patent No.: US 11,106,656 B2
(45) Date of Patent: Aug. 31, 2021

(54) METHOD AND APPARATUS FOR A SOFTWARE-SEAMED AND AUGMENTED VIEW OF AN ASYNCHRONOUS NETWORK FABRIC

(71) Applicant: Cisco Technology, Inc., San Jose, CA (US)

(72) Inventors: Praveen Parthasarathy Iyengar, Milpitas, CA (US); Shrawan Chittoor Surender, Sunnyvale, CA (US); Narayanaswami Ganapathy, Fremont, CA (US); Srinivas Pitta, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 555 days.

(21) Appl. No.: 15/662,319

(22) Filed: Jul. 28, 2017

(65) Prior Publication Data

US 2019/0034477 A1    Jan. 31, 2019

(51) Int. Cl.
| | |
|---|---|
| *G06F 16/23* | (2019.01) |
| *H04L 29/08* | (2006.01) |
| *H04L 29/06* | (2006.01) |
| *G06F 9/54* | (2006.01) |
| *G06F 16/25* | (2019.01) |
| *G06F 16/955* | (2019.01) |
| *G06F 16/2458* | (2019.01) |

(52) U.S. Cl.
CPC .......... *G06F 16/2379* (2019.01); *G06F 9/546* (2013.01); *G06F 16/2477* (2019.01); *G06F 16/258* (2019.01); *G06F 16/955* (2019.01); *H04L 67/146* (2013.01); *H04L 67/36* (2013.01); *H04L 69/08* (2013.01)

(58) Field of Classification Search
CPC ..................................................... H04L 67/146
USPC ........................................................ 709/224
See application file for complete search history.

(56) References Cited

U.S. PATENT DOCUMENTS

| | | | | |
|---|---|---|---|---|
| 2012/0275311 A1* | 11/2012 | Ivershen | ................. | H04L 43/12 370/241 |
| 2014/0365622 A1* | 12/2014 | Iyengar | ............... | H04L 41/0893 709/220 |
| 2015/0154269 A1* | 6/2015 | Miller | ................. | G06F 16/2477 715/780 |
| 2017/0187569 A1* | 6/2017 | Shiraki | ............... | H04L 41/0668 |

\* cited by examiner

*Primary Examiner* — Kevin T Bates
*Assistant Examiner* — Emad Siddiqi
(74) *Attorney, Agent, or Firm* — Merchant & Gould P.C.

(57) ABSTRACT

Methods and systems for tracking transactions in a network fabric, include: receiving a message generated by a node in the network fabric; assigning a uniform fabric identifier ("UFID") to the node; assigning a uniform transaction identifier ("UTID") to the message"; appending the UFID and the UTID to the message; and storing the message in a database.

20 Claims, 3 Drawing Sheets

METHOD AND APPARATUS FOR A SOFTWARE-SEAMED AND AUGMENTED VIEW OF AN ASYNCHRONOUS NETWORK FABRIC

TECHNICAL FIELD

This disclosure relates in general to monitoring transactions in a network fabric and, more particularly, to generating a transparent software-seamed and augmented view of the fabric.

BACKGROUND

Asynchronous switch systems can have over 200 intercommunicating applications. Cookies are generally used for storing and tracking of transient states of transactions within an application. This may not be helpful in an environment hosting asynchronous applications, as each application processes messages on a best effort basis. Moreover, when this is extrapolated to a network fabric, the existing approach will not hold true.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
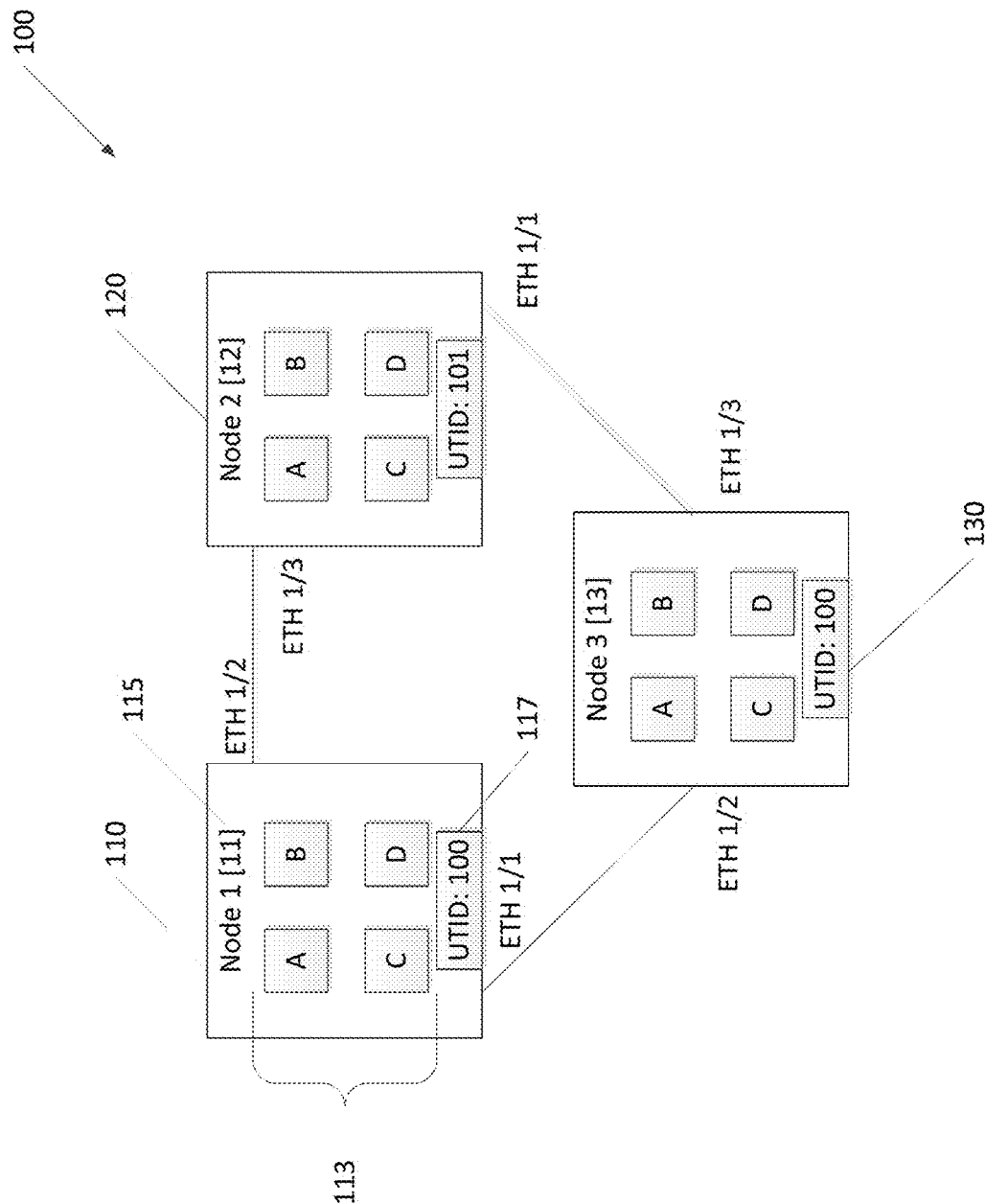
FIG. 1 illustrates an exemplary switch topology consistent with embodiments of the present disclosure.

Methods and systems for tracking transactions in a network fabric are provided. The method includes: receiving a message generated by a node in the network fabric; assigning a uniform fabric identifier ("UFID") to the node; assigning a uniform transaction identifier ("UTID") to the message; appending the UFID and the UTID to the message; and storing the message in a database.

Additional embodiments include a system of nodes arranged in a fabric. The system includes: a first node associated with a first unique-to-the-fabric fabric identifier ("UFID") and a counter providing a first unique-to-the-node transaction identifier ("UTID"), the first node operable to generate a first message with a header including the first UFID and the first UTID; a second node associated with a second unique-to-the-fabric fabric identifier ("UFID") and a counter providing a second unique-to-the-node transaction identifier ("UTID"), the second node operable to generate a second message with a header including the second UFID and the second UTID; and a data aggregator in communication with the first node and the second node and operable to receive and store the first message and the second message.

Also disclosed is another system. The system includes a processor in communications with memory and a database. The memory stores instructions for: receiving a message generated by a node in a network fabric; assigning a uniform fabric identifier ("UFID") to the node; assigning a uniform transaction identifier ("UTID") to the message"; appending the UFID and the UTID to the message; and storing the message in the database.

Example Embodiments

Presently disclosed is an apparatus and method to generate a transparent software-seamed and augmented view of the fabric, along with the ability to magnify and view each cross-section of the fabric when needed. It is realized by characterizing the events into network or configuration driven triggers by identifying and tagging control plane packets (message and transaction service packets or "MTS" packets) to yield an aggregated and sequenced view of the fabric.

A common resource across application in asynchronous systems is the interprocess communications ("IPC"). In this disclosure, the focus is upon the MTS type of IPC, but those of skill in the art upon reading this disclosure will understand that other message formats may be captured. Each node in the fabric is assigned a UTID which is an identifier unique to a particular node in the fabric, for example a switch, and will be assigned to a transaction. This UTID may be injected by the source application. In the case of command line interface ("CLI") triggers, it is populated by the virtual shell ("VSH"), and for other internal triggers the source application processing bridge protocol data units ("BPDU's") the BPDU's insert the UTID. The UFID is a unique identifier to the fabric for each node in a network fabric. In an exemplary embodiment, where existing solutions uses intermediate system-to-intermediate system ("ISIS") protocol, the disclosure contemplates reusing the ISIS unique identifier as the UFID.

While UTID tagging is sufficient for tracking transactions across applications in a single node, there are events in a fabric that occur due to a change in state of an application on a different node. These protocol packets do not carry this information in prior art systems; however, this disclosure contemplates using UFID and UTID tagging in the header to track these triggers.

For each transaction received by a node, if the UFID is the same UFID of the node then this is a CLI which is an internal trigger to the node. If the trigger is a VSH trigger, the system can identify the CLI trigger by looking up the UTID issued for the CLI to VSH.

If the UFID is not equal to the UFID of the node, the transaction is due to an event generated by a control packet received from another node. If the issue is due to an event in another node of the fabric, the system knows the UFID of the transaction and the timestamp when the packet was received on the node. A search may now be performed for the packet that was sent around that timestamp on the node with the UFID of the transaction. The system can find out the UTID of the transaction by looking at the header to the transaction or message, and by repeating this process the system can find the root cause of the failure and provide relevant logs for detailed debugging.

FIG. 1 illustrates an exemplary switch topology consistent with embodiments of the present disclosure in which an example is provided. Fabric 100 comprises three nodes: node 1 110; node 2 120; and node 3 130. The nodes happen to be connected as a ring, but any other topology is contemplated by this disclosure. The nodes are connected to each other via Ethernet. Each node, 110, 120, and 130, include a counter that counts up and serves to provide a unique UTID for that particular node. In this example the next transaction at node 1 110 will have UTID 100; the next transaction at node 2 120 will have UTID 101; and, the next transaction at node 3 130 will have UTID 100. Each node is also assigned a UFID that is unique to the fabric. Node 1 110 is assigned UFID 11; node 2 120 is assigned UFID 12; and node 3 130 is assigned UFID 13. Each node is running four applications, A, B, C, D, where these applications are not necessarily the same on all nodes.

Examining fabric 100 under the following scenario yields the following results. A VLAN 12 is created by a user on all three nodes 110, 120, and 130. Then, the user does a shutdown of VLAN 12 on node 2 120.

On Node 2:

The request is propagated by the back end of a user function, such as VSH to the VLAN Manager. The VLAN Manager shuts down VLAN 12 on node 2 120 and generates a message with a header including UTID: 101; UFID 12. All messages, or transactions, will be tagged with the [101, 12] in the header. Due to this transaction, spanning tree protocol ("STP") will put VLAN 12 to disabled on port 1/3 and 1/1. It will send control packets with that information to node 1 110 and node 3 130. The time and the application that sent that control packet is tracked on that port.

On Node 3:

The BPDU packet, or control packet, is received on port 1/3. Node 3 130 knows that the BPDU packet was received on a port connected with node 1 110 with UFID 13; therefore, the UFID for this packet is 13. The MTS header detail will be UTID 100; UFID 13. All transactions relating to node 3 will be tagged [100, 13].

On Node 1:

The BPDU packet, or control packet, is received on port 1/2. Node 2 120 knows that the BPDU packet was received on a port connected with node 1 110 with UFID 11; therefore, the UFID for this packet is 11. The MTS header detail will be UTID 100; UFID 11. All transactions relating to node 1 will be tagged [100, 11].

For the system to work in the best possible fashion, the timestamps between all nodes should be in sync.

Figure 2:
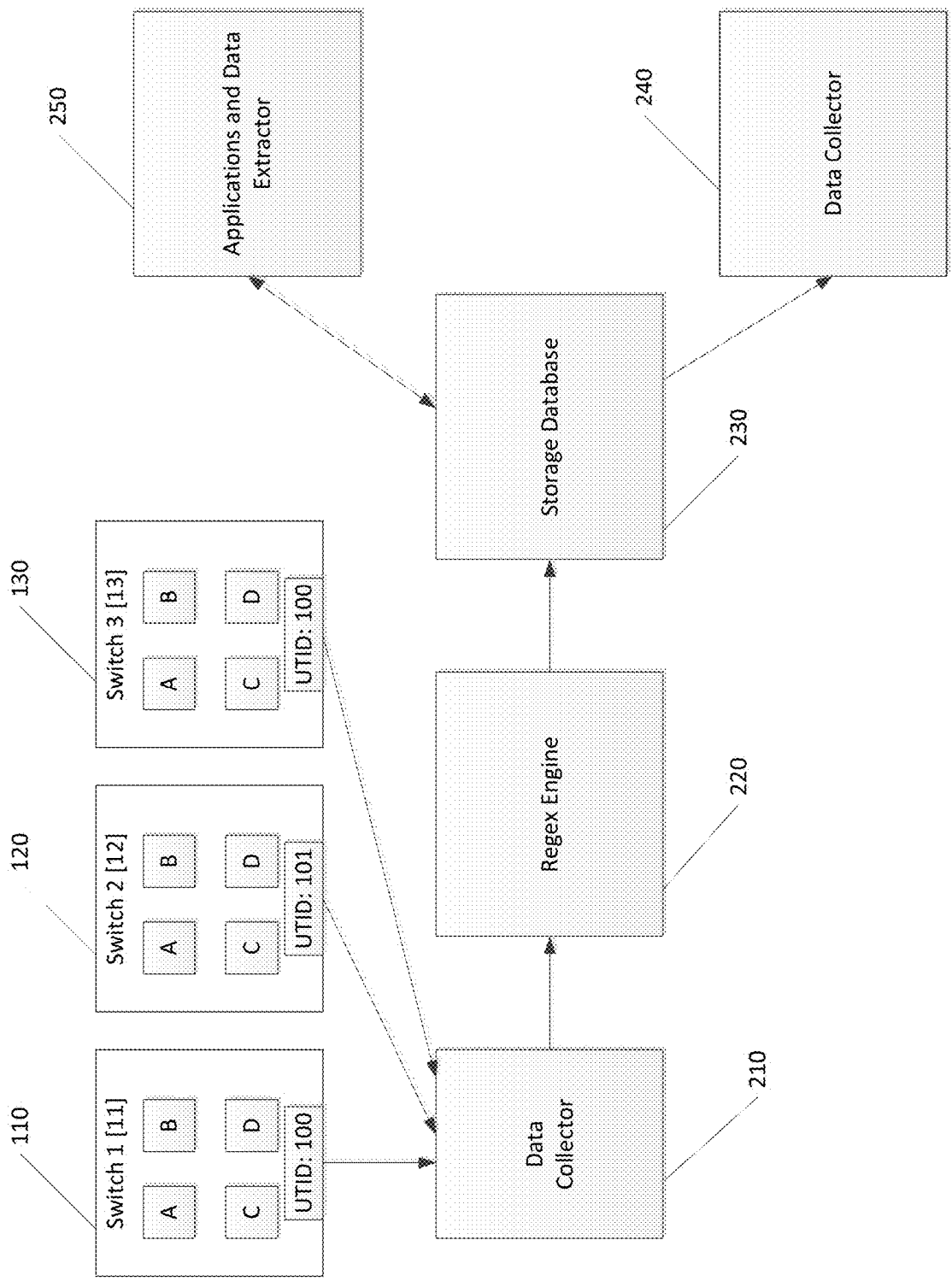
FIG. 2 illustrates an exemplary message tracking system consistent with embodiments of the present disclosure.

FIG. 2 illustrates an exemplary message tracking system consistent with embodiments of the present disclosure. The nodes of the fabric, in this example, node 1 110, node 2, 120, and node 3 130, are in communication with a data collector 210 that may be an application running on each node or running on a different node. It collects device data in a non-intrusive manner by evaluating the state of the system, prior to exporting it to a global data store. An application can push data with appropriate meta-data to this agent for publishing it to a user community.

The data collector(s) 210 are in communication with a Regex Engine 220. The RegEx Engine 220 may take messages in a diverse array of formats and place them into a common format, such as by using key-value pairs. The Regex Engine 220 may be a list of regex. Each regex may extract useful and necessary data to support various data models. The datalogs in the form of file or byte stream data is given as input to the regex engine. The input is made to run against each of the regex and the output obtained has results that populate the various data-models. The output may be a key-value pair pertaining to the data model corresponding to the regex. Users can define custom regex based on the data/log given as input and the data model. The custom regex may then be installed into the RegEx Engine 220 along with the data model.

The RegEx Engine 220 is in communication with a Storage Database 230, for example, a columnar database, for storing the output of the RegEx Engine 220 which is simply the messages placed into a common format. A data gatherer sits on top of the regex engines and does the writes to the Storage Database 230 and to a Data Collector 240 that may serve to provide notifications to users of certain user-defined changes of state of the Storage Database 230.

An Applications and Data Extractor 250 is in communication with the Storage Database 230. The Data Extractor is a query engine to extract datasets and transform, modify, aggregate, and/or process queries to feed as input for user-defined queries. The Applications are for user-customizable queries that are created with well-defined templates.

Figure 3:
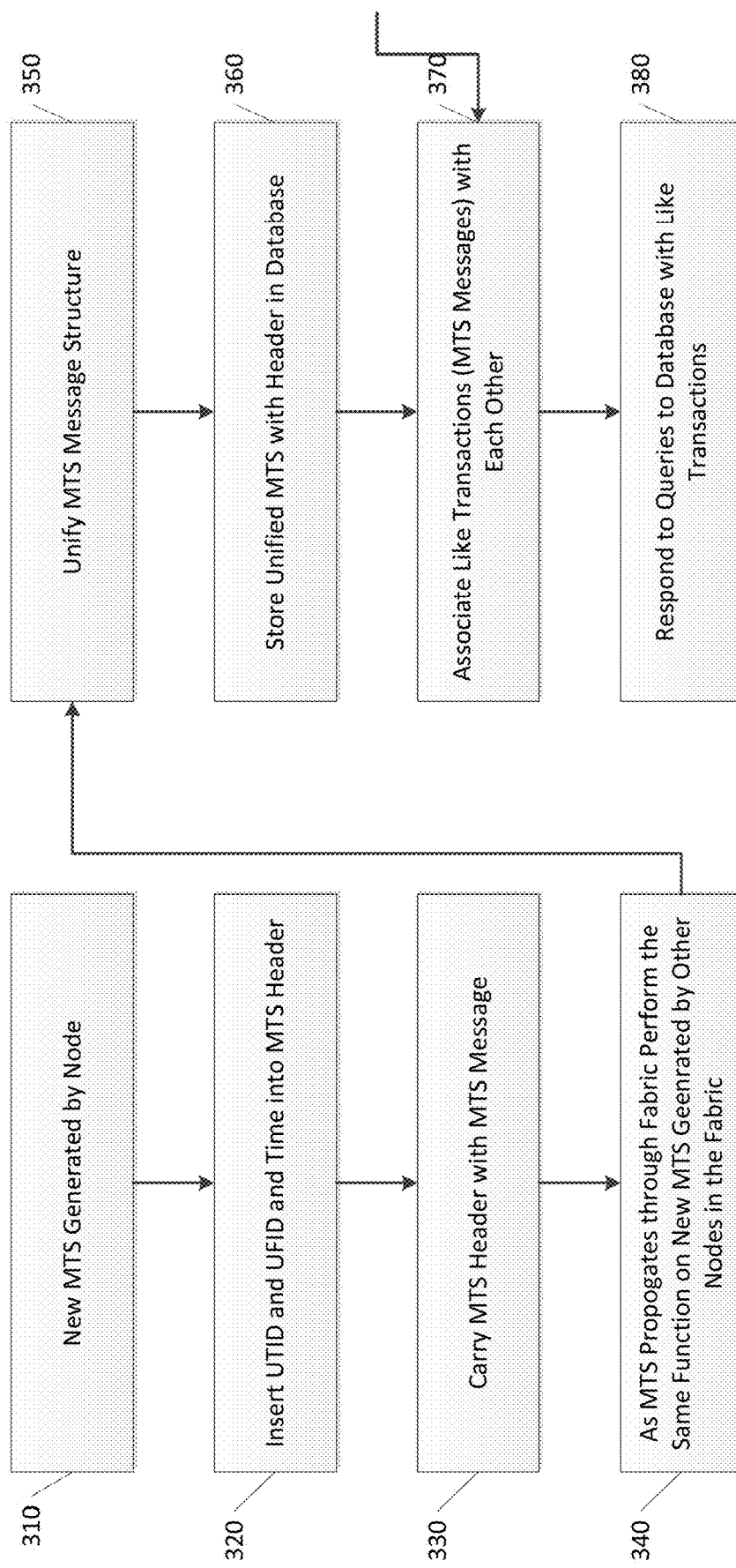
FIG. 3 is a flow chart of a message tracking process consistent with embodiments of the present disclosure.

FIG. 3 is a flow chart of a message tracking process consistent with embodiments of the present disclosure. A new message, or MTS, is generated by a node (stage 310). The current UTID and the UFID of the node, as well as the time, is inserted into the message, or MTS, header (stage 320). The MTS header is carried with the MTS Message throughout the system (stage 330). As the MTS with the header propagates through the fabric, the same function (assigning UTID and UFID) is performed by other nodes in the fabric upon receipt of the MTS with header from the first node (stage 340). The message is placed in a uniform, common format (stage 350), and stored in a database (stage 360). Upon receipt of a query, transactions with similar timestamps are associated with the message (stage 370) and responses to the queries are provided (stage 380).

Any process, descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved. In some embodiments, steps of processes identified in FIG. 3 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIG. 3 either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the switching systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

We claim:

1. A method of tracking transactions in a network fabric, comprising:

assigning a first uniform fabric identifier ("UFID") to a first node of a network fabric;
assigning a first uniform transaction identifier ("UTID") to a first message associated with a first transaction at the first node;
appending both of the first UFID and the first UTID to the first message, wherein appending both of the first UFID and the first UTID to the message comprises appending both of the first UFID and the first UTID to a header of the first message;
storing the first message in a database;
receiving a second message at the first node;
determining that a second UFID associated with the second message is not associated with the first node;
determining, in response to determining that the second UFID associated with the second message is not associated with the first node, a control message associated with the second UFID based on the second UFID and a timestamp associated with the second message;
determining a second UTID from the control message, the second UTID being associated with a second transaction; and
determining a root cause based on the second transaction.

2. The method of claim 1, wherein the first UFID is unique to the network fabric.

3. The method of claim 1, wherein the first UTID is a sequentially generated number unique to the first node.

4. The method of claim 1, wherein the first message is a message and transaction service ("MTS") high performance interprocess communications message.

5. The method of claim 1, further comprising converting the first message into a common format prior to storing the first message in the database.

6. The method of claim 5, further comprising generating a notification upon storing the first message in the database.

7. The method of claim 5, further comprising responding to a database query for another message with the first message and other associated messages having comparable time stamps.

8. A system of nodes arranged in a fabric, comprising:
a first node associated with a first unique fabric identifier ("UFID") and a counter providing a first unique transaction identifier ("UTID"), the first node operable to generate a first message with a header including the first UFID and the first UTID;
a second node associated with a second unique fabric identifier ("UFID") and a counter providing a second unique transaction identifier ("UTID"), the second node operable to generate a second message with a header including the second UFID and the second UTID; and
a data aggregator in communication with the first node and the second node and operable to receive and store the first message and the second message, wherein the first node is operative to:
receive the second message;
determine that the second UFID associated with the second message is not associated with the first node;
determine, in response to determining that the second UFID associated with the second message is not associated with the first node, a control message associated with the second UFID ID based on the second UFID and a timestamp associated with the second message;
determine the second UTID from the control message, the second UTID being associated with a second transaction at the second node; and
determine a root cause based on the second transaction.

9. The system of claim 8, wherein the data aggregator comprises a data collector for receiving the first message and the second message.

10. The system of claim 9, wherein the data aggregator further comprises a regex engine in communication with the data collector for converting the first message and the second message into a common format as a first common-format message and a second common-format message.

11. The system of claim 10, further comprising a database in communication with the regex engine for storing the first common-format message and the second common-format message.

12. The system of claim 11, further comprising a data collector in communication with the database for providing notifications to users upon storage of the first common-format message.

13. The system of claim 12, further comprising an application platform in communication with the database for creating user-customizable queries to the databased.

14. The system of claim 13, further comprising a data extractor in communication with the database and the application platform for extracting datasets from the database based on the customizable queries.

15. A system, comprising:
a memory; and
a processor in communications with the memory, wherein the processor is operative to:
assign a first uniform fabric identifier ("UFID") to a first node of a network fabric;
assign a first uniform transaction identifier ("UTID") to a first message associated with a first transaction at the first node;
append both of the first UFID and the first UTID to the first message, the processor being operative to append both of the first UFID and the first UTID to the first message comprises the processor being operative to append both of the first UFID and the first UTID to a header of the first message;
store the first message in the database;
receive a second message at the first node;
determine that a second UFID associated with the second message is not associated with the first node;
determine, in response to determining that the second UFID associated with the second message is not associated with the first node, a control message associated with the second UFID ID based on the second UFID and a timestamp associated with the second message;
determine a second UTID from the control message, the second UTID being associated with a second transaction; and
determine a root cause based on the second transaction.

16. The system of claim 15, wherein the instructions are further operable to convert the first message into a common format prior to storing the first message in the database.

17. The system of claim 15, wherein the instructions are further operable to generate a notification upon storing the first message in the database.

18. The system of claim 15, wherein the instructions are further operable to respond to a database query for another message with the first message and other associated messages having comparable time stamps.

19. The system of claim 15, wherein the first UTID is a sequentially generated number unique to the first node.

20. The system of claim 15, wherein the first message is a message and transaction service ("MTS") high performance interprocess communications message.

* * * * *